US012795387B2

(12) United States Patent
Guagliata et al.

(10) Patent No.: US 12,795,387 B2
(45) Date of Patent: Nov. 10, 2026

(54) EMULATING WIRELESS CONNECTIONS WITHIN NETWORK SIMULATIONS

(71) Applicant: Cisco Technology, Inc., San Jose, CA (US)

(72) Inventors: Justin G. Guagliata, Saint Louis, MO (US); Joseph Michael Clarke, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 310 days.

(21) Appl. No.: 18/410,529

(22) Filed: Jan. 11, 2024

(65) Prior Publication Data

US 2025/0234210 A1 Jul. 17, 2025

(51) Int. Cl.
*H04W 24/00* (2009.01)
*H04W 16/18* (2009.01)
*H04W 24/06* (2009.01)

(52) U.S. Cl.
CPC ........... *H04W 16/18* (2013.01); *H04W 24/06* (2013.01)

(58) Field of Classification Search
CPC .............................. H04W 16/18; H04W 24/06
See application file for complete search history.

(56) References Cited

U.S. PATENT DOCUMENTS

2012/0150521 A1 6/2012 Bakwill
2020/0358660 A1* 11/2020 Vecera .................. H04L 43/067
2023/0179487 A1 6/2023 Taylor
2023/0262000 A1* 8/2023 Khawaja ............... H04L 43/062 370/230.1
2023/0262477 A1 8/2023 Yang et al.

FOREIGN PATENT DOCUMENTS

CN 101925102 A 12/2010
CN 105337833 A 2/2016

OTHER PUBLICATIONS

Github, “Mininet-WiFi,” Intrig-Unicamp, https://github.com/intrig-unicamp/mininet-wifi, retrieved from the Internet on Oct. 23, 2023. 5 pages.
Apposite Technologies, “Satellite Performance Test Tools,” https://www.apposite-tech.com/, retrieved from the Internet on Oct. 23, 2023, 5 pages.

* cited by examiner

*Primary Examiner* — Shantell L Heiber
(74) *Attorney, Agent, or Firm* — Edell, Shapiro & Finnan, LLC

(57) ABSTRACT

Techniques presented herein generate a virtual wireless topology within a network emulation for validation, testing, and troubleshooting of a wireless network. Methods involve obtaining wireless network topology information including a plurality of attributes related to at least two wireless devices and a physical space in which the at least two wireless devices are to be deployed in a wireless network in the physical space. The methods further involve generating a virtual wireless network of the wireless network in a network simulation based on the wireless network topology information and determining signal attenuation characteristics with respect to the at least two wireless devices in the virtual wireless network to evaluate operation of the wireless network in the physical space.

20 Claims, 7 Drawing Sheets

400

EMULATING WIRELESS CONNECTIONS WITHIN NETWORK SIMULATIONS

TECHNICAL FIELD

The present disclosure relates to network simulation tools and services.

BACKGROUND

Network configuration and management are no easy tasks. Network simulations and/or emulations are helpful for understanding and managing network(s). Network simulation and/or emulation tools may simulate some of the behaviors of overall operation of a simulated network configuration as well as limited behaviors of simulated network devices included in the network configuration. Network emulators may allow emulations of virtual devices that are connected to one another via wired connections. That is, network emulators may emulate virtual devices with wired connections within an emulated virtual network environment.

DETAILED DESCRIPTION

Overview

Figure 1A:
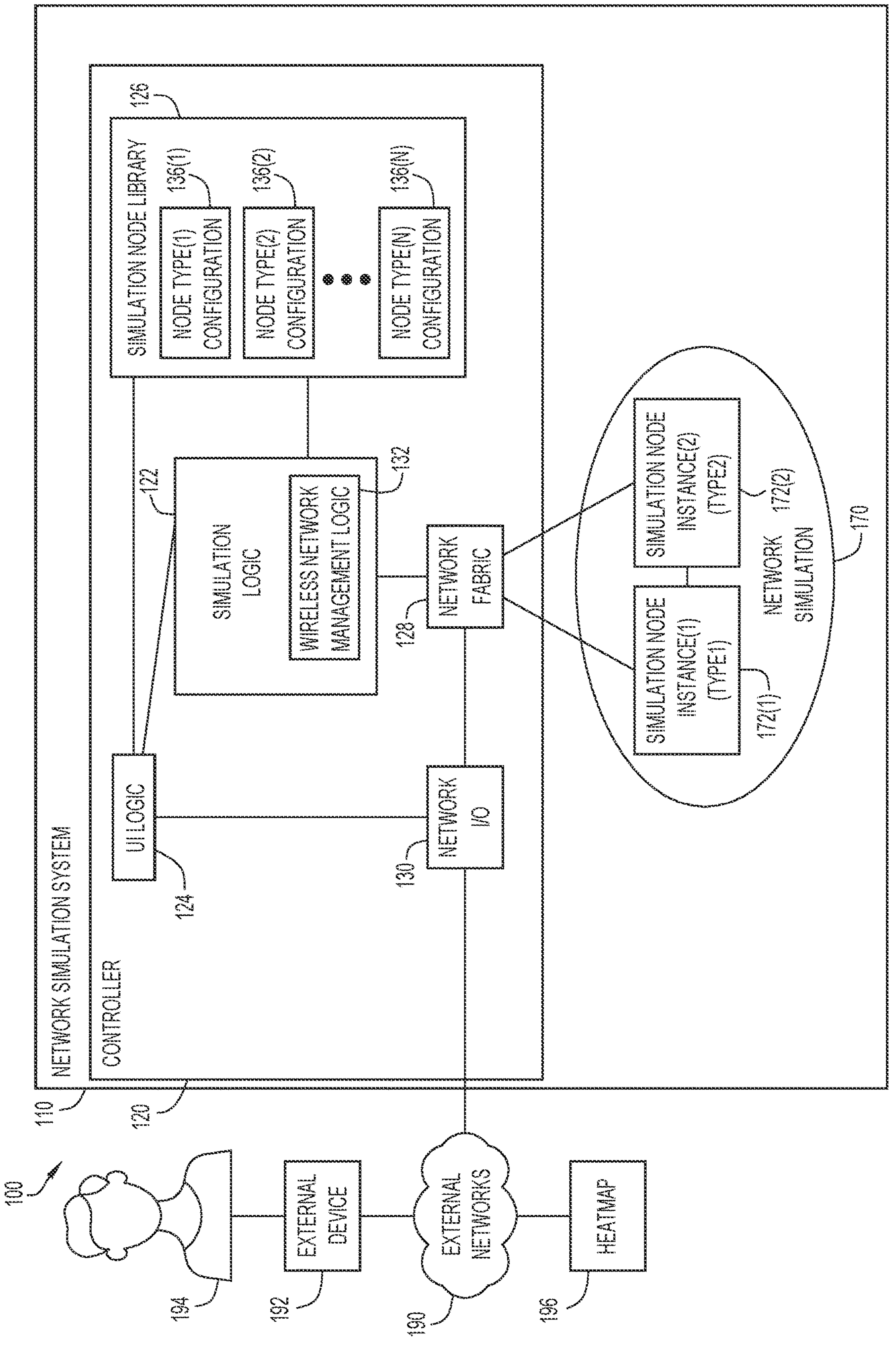
FIG. 1A is a block diagram of a system in which a virtual wireless network may be generated within a network simulation environment, according to an example embodiment.

Techniques presented herein generate a virtual wireless topology within a network emulation for validation, testing, and troubleshooting of a wireless network. The techniques presented herein include emulating complex scenarios for device roaming and/or interferences without needing physical presence in the space or a physical access point.

In one form, methods are provided that involve obtaining wireless network topology information including a plurality of attributes related to at least two wireless devices and a physical space in which the at least two wireless devices are to be deployed in a wireless network in the physical space. The methods further include generating a virtual wireless network of the wireless network in a network simulation based on the wireless network topology information and determining signal attenuation characteristics with respect to the at least two wireless devices in the virtual wireless network to evaluate operation of the wireless network in the physical space.

Example Embodiments

As noted above, network emulators may allow for emulation of virtual devices with wired connections. However, network emulators cannot emulate virtual devices with wireless connections. As such, users cannot use virtual devices with wireless connections (e.g., IEEE 802.11x) in network simulations.

Some workarounds may be available. For example, network emulators such as modeling labs may provide external connectivity, which allows users to bridge wired connections from virtual devices into physical devices. This provides a workaround in which users connect a physical access point inside the simulation and then have this access point communicating wirelessly to other physical devices that are also outside the simulation. In this workaround, users acquire physical wireless hardware, which can be costly. Moreover, broadcasting wirelessly may generate wireless conflicts and limit testing capabilities.

Wi-Fi® wireless network planning tools help predict a heatmap based on physical characteristics of buildings and rooms. A network or wireless network heatmap is a visual representation of wireless signal coverage and strength for a particular access point. This heatmap may be generated during a site survey by a technician who walks around the physical space to measure signal strength, i.e., "boots on the ground" technique. The Wi-Fi planning tools are limited and do not emulate wireless connections of virtual devices. For example, Wi-Fi planning tools are not only a prediction but also cannot emulate a wireless network based on the characteristics of the physical space. Moreover, the "boots on the ground" technique has a technician present at the site (the physical space), which is time consuming, error prone, and costly.

The techniques presented herein generate a virtual wireless network that may pass IEEE 802.11 frames based on provided physical characteristics of the network and/or virtual wireless network devices. The techniques presented herein generate virtual wireless network topology for validation, testing, and troubleshooting of a wireless network that is deployed (or is to be deployed) in a physical space, including simulating complex scenarios for wireless client device roaming and/or interferences without needing the boots on the ground (i.e., a physical access point or technician present). The techniques presented herein may leverage modeling labs or any orchestrated virtual environments.

The techniques presented herein obtain wireless network topology information, including a plurality of attributes related to at least two wireless devices and a physical space in which the at least two wireless devices are to be deployed in a wireless network in the physical space. The techniques presented herein generate a virtual wireless network, representative of the wireless network, in a network simulation based on the wireless network topology information. The techniques presented herein determine signal attenuation characteristics with respect to the at least two wireless devices in the virtual wireless network to evaluate operation of the wireless network in the physical space. The signal attenuation characteristics are measured based on virtual 802.11 frames that are transmitted between two virtual wireless network devices.

In the techniques presented herein, at least two new virtual device types (reference platforms) may be generated for wireless network simulations. One device type may be a wireless client device and the other device type may be a wireless access point (WAP)/bridge. Both virtual wireless devices may execute Linux and use an existing Linux driver (e.g., mac80211_hwsim) to provide emulated wireless interfaces that establish wireless connections with one another. In one or more example embodiments, these virtual devices may have a mix of both emulated wireless interfaces and regular wired interfaces.

The techniques presented herein may further generate virtual wireless zones. The virtual wireless zones may be applied to virtual wireless devices (virtual nodes) to modify and limit connectivity between their wireless interfaces. A virtual wireless zone is associated with a specific virtual wireless access point (VWAP). In one example embodiment, wireless zones may overlap with one another. A virtual wireless zone may be defined to include dimensional and orientation metadata, which sets the relative size and shape of the respective virtual wireless zone in the emulated network topology. In one example embodiment, the size and shape of the virtual wireless zone may be generated based on AP heatmap data. Moreover, in one example embodiment, orientation of the virtual wireless zone, as well as other characteristics (e.g., transmission attributes such as range, connectivity profile, etc.), may be configured within the network topology.

The techniques presented herein may generate a virtual wireless zone per simulated network (modeling lab), and then add, to the virtual wireless zone, two or more virtual wireless devices (nodes) with respective wireless capabilities (e.g., defined in a connectivity profile). This allows for wireless interfaces of these virtual nodes to communicate with each other based on being part of the same virtual wireless zone. Connectivity may be provided through the fabric when the virtual wireless interfaces of these nodes are in an up state (a running state). Additional wireless zones may be generated to limit communication by assigning nodes to different zones. Nodes may be added to multiple virtual wireless zones, allowing them to view/receive beacons respective to each virtual wireless zone. The virtual nodes are configured to pass virtual 802.11 frames with respect to one another and signal attenuation characteristics may then be determined based on these virtual 802.11 frames. For example, a signal attenuation model for a wireless access point may be generated based on measuring latency of one or more virtual traffic data frames propagating between the at least two wireless devices in the network simulation.

Based on these network simulations, operations of the wireless network in the physical space are evaluated for troubleshooting, testing, and validation. For example, performance of a wireless network in a conference hall may be evaluated with various obstacles (e.g., 2,000 people with their user devices and 222 advertisement booths/stands). Using the network simulation, an optimum configuration for the wireless network may be generated, e.g., configure a predetermined number of wireless zones, WAPs, and configure each WAP with certain characteristics/attributes (limit signal strength, orientation, etc.) without having a technician present in the physical space. Based on the techniques presented herein, configuring a wireless network may be more efficient, timelier, and automated. Moreover, wireless network performance or operations even for complex scenarios may be evaluated based on these network simulations.

Figure 1B:
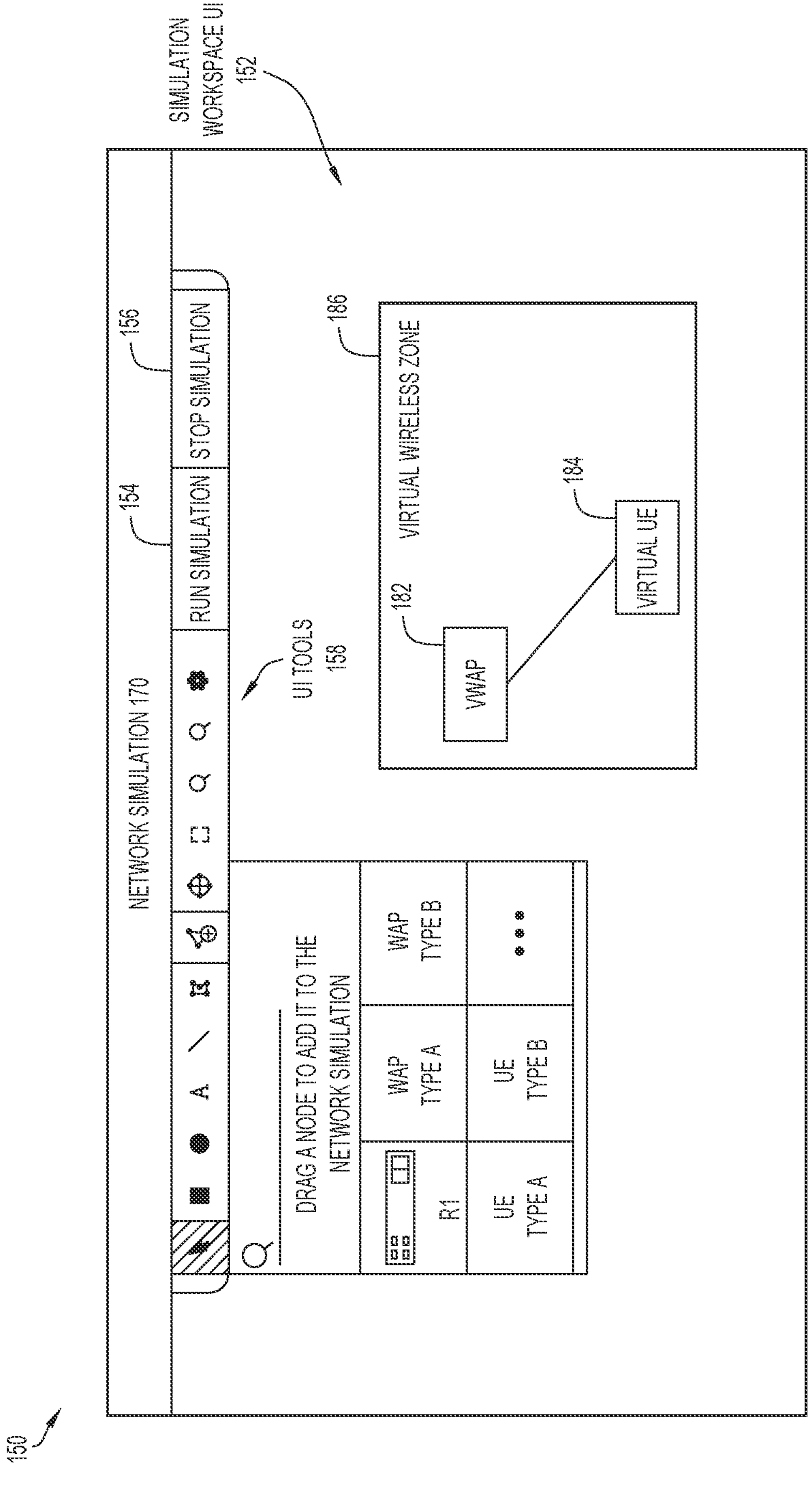
FIG. 1B is a diagram illustrating a user interface screen that may be utilized for configuring and operating a network simulation in which a virtual wireless network is generated, according to an example embodiment.

Referring to FIG. 1A, FIG. 1A is a block diagram of a system 100 in which a virtual wireless network may be generated within a network simulation environment, according to an example embodiment. FIG. 1B is a diagram illustrating a user interface (UI screen 150) that may be utilized for configuring and operating a network simulation in which a virtual wireless network is generated, according to an example embodiment. FIG. 1B is discussed in relation to features discussed for FIG. 1A.

As shown in FIG. 1A, the system 100 may include a network simulation system 110 that can interface with one or more external devices, such as an external device 192, via one or more external networks 190. As further shown in FIG. 1A, a user 194 is illustrated, which may operate the network simulation system 110 via the external device 192 (e.g., a computing device, such as a laptop, desktop computer, or the like). The network simulation system 110 may obtain network topology information about a wireless network that is to be deployed or configured via one or more external networks 190. The network simulation system 110 may obtain a heatmap 196 of a physical space in which the wireless network is to be configured/reconfigured or for which troubleshooting is to be performed. The heatmap 196 may provide attributes of the physical space, including various objects or structures in the physical space that may represent or cause interference for the wireless transmissions.

The network simulation system 110 is deployed to evaluate operations of the wireless network in the physical space (defined by the heatmap 196) including validating the wireless network, testing performance of the wireless network, and/or troubleshooting the wireless network based on determined signal attenuation characteristics, e.g., to identify and fix dead zones, avoid interferences, etc. That is, using the network simulation system 110, signal attenuation characteristics of the virtual wireless devices in the virtual wireless network are determined to configure the actual wireless device(s) in the wireless network.

As further illustrated in FIG. 1A, the network simulation system 110 may include a controller 120 through which one or more virtual network simulations, such as a virtual wireless network simulation (a network simulation 170), may be configured and operated. In some instances, the network simulation 170 as discussed herein can also be referred to as a "lab" or a "modeling lab". In at least one example embodiment, controller 120 may include simulation logic 122 including wireless network management logic 132, user interface logic (UI logic 124), a simulation node library 126, network fabric 128, and network input/output (I/O) interfaces, shown in FIG. 1A as network I/O 130. Network I/O 130 is also referred to interchangeably herein as an ethernet hardware interface element.

Simulation node library 126 may include configuration or network topology information (attributes) that defines a number of different types of simulation nodes that can be incorporated into a given network simulation in which each of the simulation nodes may be associated with a certain type of network device, such as an access point, user equipment, a client device, a switch, a router, a gateway, an optical transmit/receive module, a load balancer, an authentication element, a network interface card, including any variations thereof (e.g., 4-port, 8-port, etc.) and/or any other type of network element that may be utilized within a network simulation. In at least one example embodiment, a node type(1) configuration 136(1) can be provided for a first type of simulation node e.g., a wireless access point, a node type(2) configuration 136(2) can be provided for a second type of simulation node e.g., a wireless client device, and so on for any 'N' types of simulation nodes (node type(N) configuration 136(N)).

The notations 1, 2, 3 . . . n; a, b, c, . . . n; "a-n", "a-d", "a-f", "a-g", "a-k", "a-c", and the like illustrate that the number of elements can vary depending on a particular implementation and is not limited to the number of elements being depicted or described. Moreover, this is only examples of various components, and the number and types of components, functions, etc. may vary based on a particular deployment and use case scenario.

The simulation logic 122 including wireless network management logic 132, user interface logic (UI logic 124), simulation node library 126, and network I/O 130 may interface and operate together in any appropriate manner to facilitate configuring and operating the network simulation 170, by one or more users, such as the user 194 via the external device 192, in accordance with example embodiments herein.

In various example embodiments, network I/O 130 may be configured as one or more Ethernet port(s), Fibre Channel ports, any other I/O port(s) now known or hereafter developed and may include and/or interface with one or more of the network processor units (not shown) provided for the controller 120 to provide any suitable interfaces for receiving, transmitting, and/or otherwise communicating data and/or information within the system 100.

Broadly, a node configuration for a given type of simulation node, as provided for/included within simulation node library 126, can define default parameters or attributes, and/or operational behavior for the given type of simulation node. When a particular instance of a given type of simulation node is included in a particular network simulation, additional parameters or attributes can be configured for the particular simulation node instance, including, but not limited to, an Internet Protocol (IP) address, service set identifier (SSID), media access control (MAC) address, frequency range, transmit power, antenna type, number of antennas, signal strength, connectivity profile, size and shape of area coverage (dimensions), etc. and, in accordance with example embodiments herein, one or more actions may be performed on behalf of the particular simulation node instance for the particular network simulation.

As generally illustrated via FIG. 1B, configuration and operation of a given network simulation, such as the network simulation 170 of FIG. 1A may involve a user, such as user 194, dragging and dropping an instance of a given simulation node type into a simulation workspace UI 152 of the user interface screen (UI screen 150), as shown in FIG. 1B, which can be facilitated via UI logic 124 of controller 120. Further, the user 194 may select to run simulation (run simulation button 154) or to stop simulation (stop simulation button 156) to determine performance characteristics of the virtual wireless network e.g., evaluate operation of a virtual wireless access point. The run simulation button 154 and the stop simulation button 156 are examples of UI elements and other UI elements in a UI tools 158 are within the scope of this disclosure.

When the simulation is being executed or run, signal attenuation characteristics of one or more virtual wireless devices are determined to evaluate operation of the wireless network in the physical space. Additionally, using the UI tools 158, various interference factors (e.g., virtual representation of physical objects or structures) may be added to the virtual wireless network being emulated. Moreover, movement or roaming of a wireless client device may be performed using the UI tools 158, e.g., by moving the client device to various locations in the simulation workspace UI 152.

Consider an illustrative example of configuring and operating a network simulation, such as for configuring and operating the network simulation 170. The example regarding network simulation 170 is provided for illustrative purposes only and is not meant to limit the broad scope of example embodiments herein.

For example, as illustrated in FIGS. 1A and 1B, the user 194 may drag and drop an instance of node type(1) into the network simulation 170, shown as simulation node instance (1) (type 1) 172(1), e.g., a virtual wireless access point (VWAP 182), and may also drag and drop an instance of node type(2) into the network simulation 170, shown as simulation node instance(2) (type 2) 172(2), e.g., a virtual wireless client device or user equipment (virtual UE 184). Within the simulation workspace UI 152, the user 194 can establish a wireless connection between the two simulation node instances together (e.g., generally illustrated via the line interconnecting simulation node instance(1) 172(1) and the simulation node instance(2) 172(2)).

The controller 120, via simulation logic 122 and the wireless network management logic 132, can facilitate interconnection between each of the simulation node instances configured for network simulation 170 and network I/O 130 for operation (e.g., at runtime) of the network simulation 170. In a similar manner, any number of simulation node instances may be configured for any other network simulations that may be configured/operated via network simulation system 110, such as simulation node instances 172(X) that may be configured for network simulation 170(X).

As referred to herein, the terms "simulation node instance" and "simulation node" (and any variations thereof) can be used interchangeably to refer to an instance of a type of simulation node that has been configured for operation within a given network simulation. Also, the simulation node instance may be referred to as a virtual node or a virtual device interchangeably.

As noted above, upon placing (dragging and dropping) a given simulation node instance within the network simulation, additional parameters or attributes can be configured for the particular simulation node instance, including, but not limited to, an SSID, signal strength, transmission range and frequency, dimensional (size and shape), connectivity profile, etc., and, in accordance with example embodiments herein, one or more attributes that define virtual wireless devices. By way of an example, for the VWAP 182, wireless transmission attributes may be defined or adjusted such as signal strength, frequency range, transmission distance, orientation of antennas, dimensions (shape and size), etc. By way of another example, for the virtual UE 184, a type of wireless device, wireless protocols supported, connectivity profile, security settings, etc., may be defined. The attributes may be defined as metadata.

Additionally, a virtual wireless zone 186 in the network simulation may be generated. The virtual wireless zone includes an associated virtual wireless access point (the VWAP 182) and metadata defining relative dimensions (shape, size, range, etc.) and other attributes of the VWAP 182. The virtual wireless zone may further include interference factors such as virtual objects that represent physical objects or structures in the physical space, e.g., walls, other user devices, people, furniture, etc.

Referring back to FIG. 1A, a heatmap 196 of a physical space in which a wireless network is to be deployed may be obtained via external network(s) 190. The virtual wireless zone 186 may be generated based on the heatmap 196. That is, in generating the virtual wireless zone 186, attributes of the virtual wireless zone 186 are determined or defined based on characteristics of the physical space and/or the heatmap 196. Attributes may include orientation, size, and/or shape for the virtual wireless zone 186. Using the heatmap 196, one or more interference factors may be added to the virtual wireless zone 186.

In accordance with example embodiments herein, the user 194 may be able to direct the controller 120, via simulation logic 122 and the wireless network management logic 132, to perform one or more actions or commands, collectively referred to herein as 'actions', on behalf of the particular simulation node through operation of the particular network simulation. For example, the virtual UE 184 may be dragged (moved) in the virtual wireless zone 186 or outside the virtual wireless zone 186. Actions performed by the controller 120 on behalf of a particular simulation node may encompass any actions/commands that may facilitate operation of a simulation node/network simulation in accordance with example embodiments herein. For instance, actions may involve movements of the virtual UE 184 to various locations and/or roaming of the virtual UE 184 between virtual wireless zones (VWAPs).

In one example, a user, such as the user 194, can initiate operation of a network simulation, such as the network simulation 170, via selection of a UI element (e.g., the run simulation button 154) provided via the UI screen 150, as shown in FIG. 1B. When running the network simulation 170, signal attenuation characteristics are measured or calculated with respect to the at least two wireless devices in the virtual wireless network. For example, based on a virtual wireless connection established between the VWAP 182 and the virtual UE 184, one or more beacon signals, probe requests, responses, and/or other virtual 802.11 frames may be transmitted. Performance of the virtual wireless network may then be determined based on these frames and/or measured signal attenuation characteristics e.g., signal strength.

During the network simulation 170, the user 194 may move the virtual UE 184 on the UI screen 150 to different locations to measure signal attenuation characteristics at each different location. In one example embodiment, the wireless network management logic 132 is configured to control movement of the virtual UE 184 to different locations within the virtual wireless network. Additionally, in one example embodiment, the wireless network management logic 132 is configured to determine an optimum location for the VWAP 182 based on measured signal attenuation characteristics. When multiple virtual wireless zones are present in the network simulation 170, the wireless network management logic 132 may be configured to roam the virtual UE 184 between these virtual wireless zones and determine signal attenuation characteristics based on roaming. The wireless network management logic 132 may then generate a proposed wireless network topology such as attributes for the virtual wireless network zones and attributes for the VWAPs. The wireless network management logic 132 may generate a signal attenuation model based on measured latency of the virtual traffic data frame propagation between virtual wireless devices in the network simulation. The wireless network management logic 132 may also obtain one or more reconfiguration instructions based on measuring of the signal attenuation characteristics at the one or more locations. The one or more reconfiguration instructions may involve adding an additional wireless access point or changing one or more of the wireless network transmission parameters including a signal strength or a range of a respective virtual wireless access point in the virtual wireless network of the network simulation. The one or more reconfiguration instructions may further involve movement of a wireless access point to a different location or movement or adjustments to a wireless zone, reconfiguration of a connectivity profile, updating metadata defining the dimensions of the wireless zone, etc.

In one example, a user, such as user 194, can stop operation of a network simulation, such as the network simulation 170, via selection of a UI element (e.g., the stop simulation button 156) provided via the UI screen 150, as shown in FIG. 1B. The UI screen 150 is just one example of obtaining user input. Other user input techniques are within the scope of this example embodiment.

With continued reference to FIGS. 1A and 1B, FIGS. 2-4 are views illustrating example user interface screens that may be utilized to perform a network simulation of a virtual wireless network, according to one or more example embodiments. These user interface screens include a first virtual wireless access point (WAP1 210) and a second virtual wireless access point (WAP2 220) to which one or more client devices are attached (wirelessly connected) such as a first CL 230 and a second CL 240. The user interface screens may be configured, via the simulation workspace UI 152 of FIG. 1B, which can be facilitated via the UI logic 124 of controller 120 of FIG. 1A. The network simulations are then executed via the simulation logic 122 with the wireless network management logic 132 of FIG. 1A.

Figure 2:
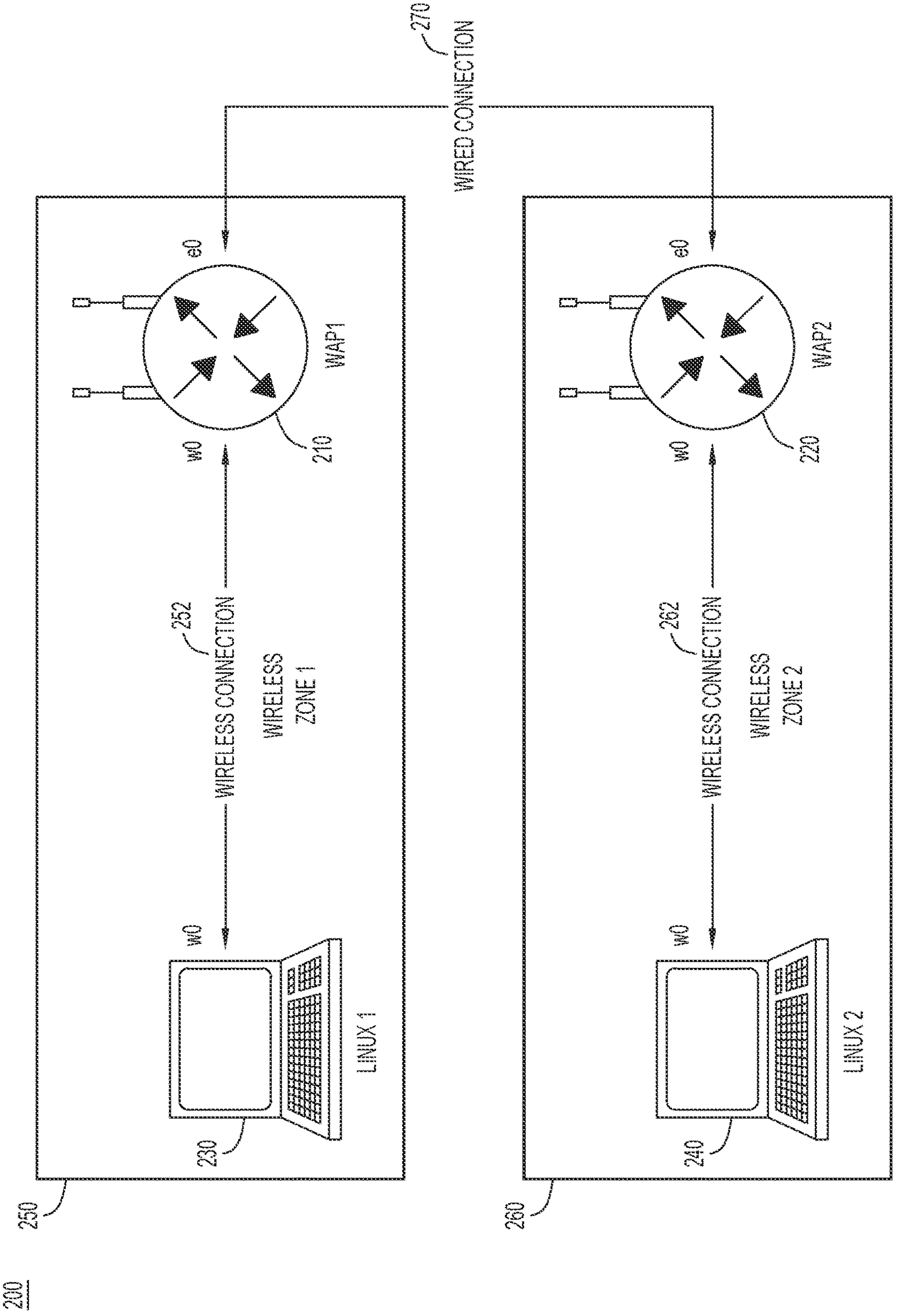
FIG. 2 is a view illustrating a user interface screen for determining signal attenuation characteristics with respect to the wireless devices in virtual zones of a virtual wireless network during a network simulation, according to an example embodiment.

Referring to FIG. 2, FIG. 2 is a view illustrating a user interface screen 200 for determining signal attenuation characteristics with respect to the wireless devices in virtual zones of a virtual wireless network during a network simulation, according to an example embodiment. In the user interface screen 200, an emulated network includes two virtual wireless zones such as a first virtual wireless zone 250 and a second virtual wireless zone 260. Both virtual wireless zones include two virtual nodes. The zones are connected to one another via a wired connection 270.

Specifically, in the first virtual wireless zone 250, the first CL 230 e.g., a Linux client device or node (Linux 1) establishes a wireless network connection 252 with the WAP1 210. In the second virtual wireless zone 260, the second CL 240 e.g., a Linux client device or node (Linux 1) establishes a wireless network connection 262 with the WAP2 220. That is, the first CL 230 communicates with the WAP1 210 via an implicit wireless connection that is created when interfaces (w0) are activated. These virtual devices cannot communicate with virtual devices in the second virtual wireless zone 260 since they are in different zones. Traffic from the first virtual wireless zone 250 propagates to the second virtual wireless zone 260 between the WAP1 210 and the WAP2 220 via the wired connection 270 (wired interfaces e0).

When a network simulation is being executed e.g., selecting the run simulation button 154 of FIG. 1B, signal attenuation characteristics may be determined. To simulate latency on traffic passing through the network simulation and to simulate wireless signal propagation, additional properties are set under each virtual wireless zone to form a model. These properties may also be imported/linked from an external tool such as a network management platform. When this model is generated, it is fed back to the interfaces of the virtual nodes such as the first CL 230 e.g., to influence wireless AP joins.

The model includes wireless network topology information i.e., attributes of the wireless devices and a physical space in which the wireless devices are to be deployed in the wireless network in the physical space. Attributes may include transmission and configuration parameters such as positioning of the virtual nodes, distances between the nodes, signal strengths, zone dimensions, sizes, orientations, transmission power, etc.

In one example embodiment, the model includes positions of various virtual nodes and distance between these virtual nodes. For example, the user 194 of FIG. 1A may manipulate the simulation workspace UI 152 of FIG. 1B (provide input data) to place virtual nodes on the canvas of the simulation workspace UI 152 and move these nodes to different locations on the canvas using UI tools 158 of FIG. 1B. This technique may imitate a technician walking around a physical space to measure signal attenuation characteristics. However, instead of a "boots on the ground" approach, the user 194 manipulates the UI tools and/or provides user input to generate movement of the virtual nodes to different locations within the network simulation.

Similarly, the user 194 may drag and drop a virtual zone to the simulation workspace UI 152 and manipulate or reconfigure the dimensions using the UI tools 158 or other user interface techniques. In one example embodiment, the virtual nodes may be placed in default locations with default characteristics, when selected in the simulation workspace UI 152 of FIG. 1B. This default attributes and/or locations may then be manually overridden with more specific properties (attributes) of the virtual wireless zone using the UI tools 158, for example. In one example embodiment, the network topology information is imported from an external system e.g., network management platform. The imported model may then be evaluated to determine operation of the wireless network and/or configured with other attributes based on measured signal attenuation characteristics. That is, other network topological annotations are insertable within a virtual wireless zone and into the attenuation model. When doing so, metadata for those elements provides physical properties such as material and thickness.

When the network simulation is executed, client-to-AP attenuation is performed based on physical wireless network characteristics (e.g., Wi-Fi characteristics) along with relative distance of the virtual client device and topological annotations and fed into the underlying virtual network fabric to modify packet loss, jitter, and latency characteristics based on physical network models. In other words, the virtual wireless network is generated based on wireless network topology information i.e., attributes of wireless devices, wireless network, and the physical space.

Moreover, the generated model (i.e., the virtual wireless network) may then be adjusted and tested for various complex scenarios such as updating virtual node distances in real-time by changing the node positions on the simulation workspace UI 152, which allows for features such as simulated roaming or device movement. In one example embodiment, based on the network simulation, the generated model is adjusted in terms of attributes and locations of the virtual WAPs to improve performance of the virtual wireless network i.e., to improve or minimize signal attenuation characteristics. A signal attenuation model may be generated based on measuring latency of one or more virtual traffic data frames propagating between the at least two wireless devices in the network simulation.

As an example, the size of the first virtual wireless zone 250 may be increased so that the first CL 230 has a received signal strength indicator (RSSI) above a predetermined threshold at any location within the first virtual wireless zone 250, where the first virtual wireless zone 250 is a virtual representation of a physical space (e.g., a conference room). Next, one or more interference factors may be added via UI tools 158 (e.g., add virtual representation of 111 people with their user devices) into the virtual wireless network. Based on measured signal attenuation characteristics in the virtual wireless network with interference factors, the virtual wireless network may be split into two zones e.g., add the second virtual wireless zone 260. When the second virtual wireless zone 260 is added, the size of the first virtual wireless zone 250 may be decreased. Using the simulation logic 122 including the wireless network management logic 132, configuration and attributes for deploying a wireless network in a physical space are generated based on the network simulation of the virtual wireless network. The generated configuration and attributes may be provided without "boots on the ground" and without the technician manually trying various configurations and locations of the wireless devices such as WAPs.

The techniques presented herein attach virtual devices to virtual space and assign attributes to these virtual devices and dynamically determine a signal attenuation model based on measuring latency of one or more virtual traffic data frames propagating between the at least two wireless devices in the network simulation. For example, a user may open a web browser on a virtual wireless client device and determine latency associated with browsing the Internet using the virtual wireless network.

Figure 3:
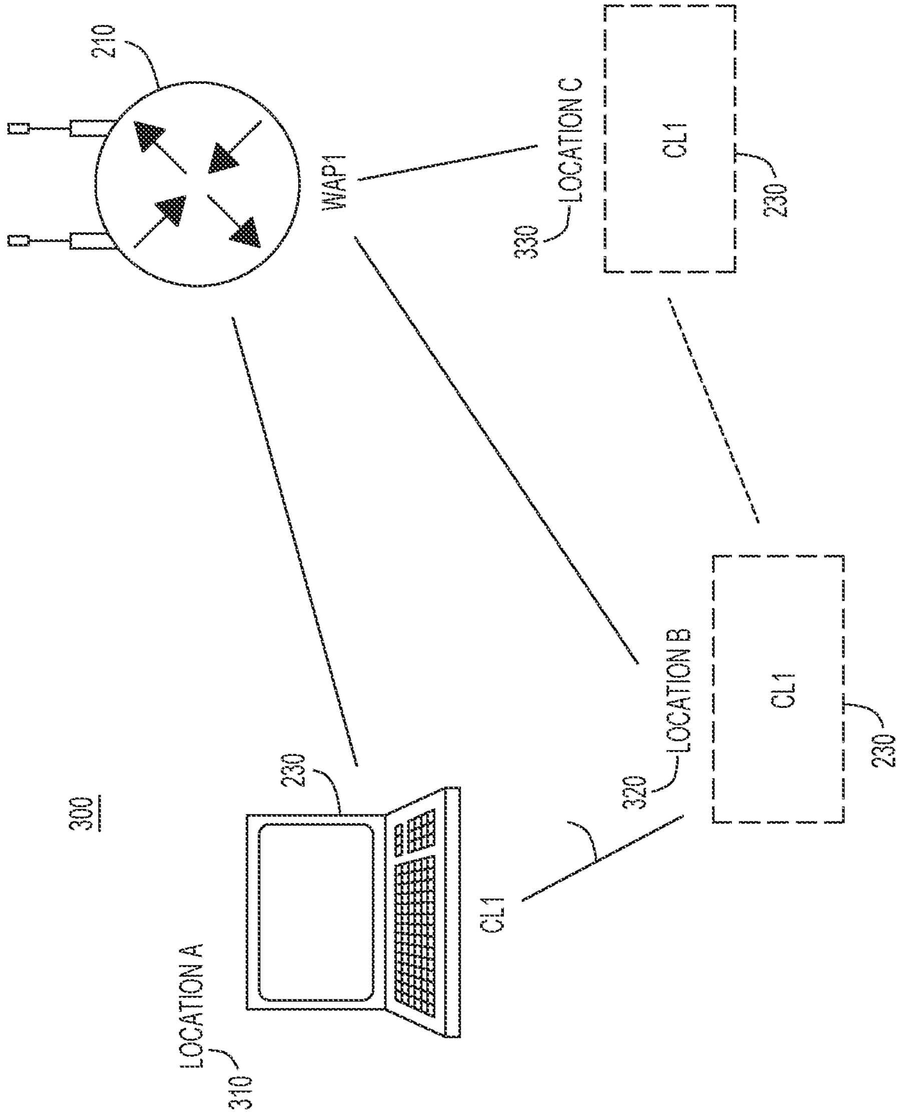
FIG. 3 is a view illustrating a user interface screen for manipulating joining one of virtual wireless access points of a virtual wireless network during a network simulation, according to an example embodiment.
Figure 4:
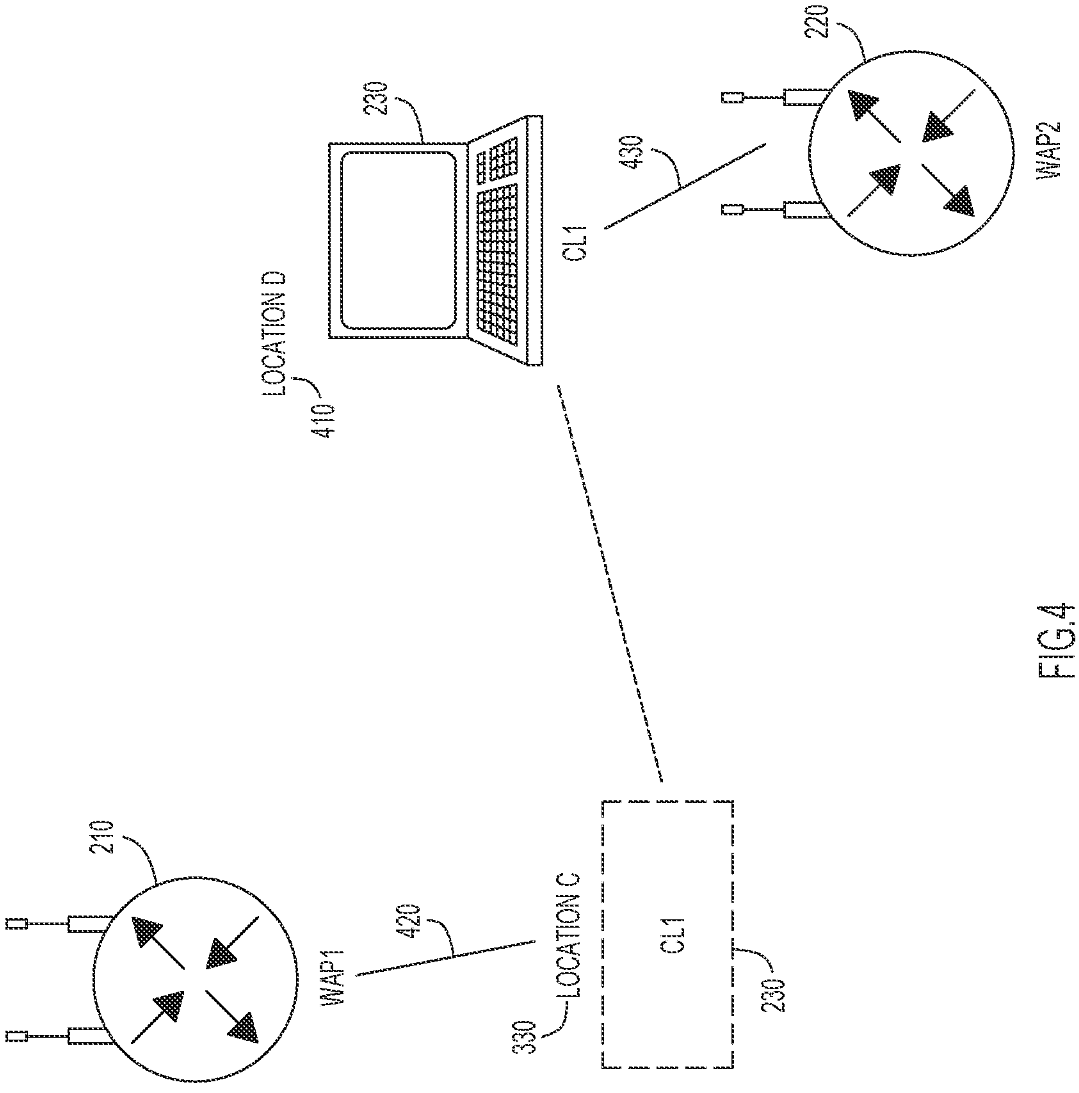
FIG. 4 is a view illustrating a user interface screen in which a virtual wireless client device is roaming to attach to a different virtual wireless access point in a network simulation, according to an example embodiment.

Referring now to FIG. 3, FIG. 3 is a view illustrating a user interface screen 300 for manipulating joining one of virtual wireless access points of a virtual wireless network during a network simulation, according to an example embodiment. In the user interface screen 300, the first CL 230 of FIG. 2 is shown moving from a location A 310 to a location B 320, and then to a location C 330, thus emulating client device roaming including AP joining.

During the network simulation, as the first CL 230 moves from the location A 310 to the location B 320 and then to the location C 330, distance to each of the WAP1 210 and the WAP2 220 is calculated as well as other signal attenuation characteristics such as the RSSI for each of the WAP1 210 and the WAP2 220. Based on the determined RSSI, the first CL 230 may join or attach to the WAP1 210 or the WAP2 220. That is, manipulating the network topology information such as transmission power, may influence which WAP the client device will join (attach to). The calculated distance between the first CL 230 and the WAPs and the generated RSSI, is fed back to the wireless interfaces to influence roaming and attachment of the first CL 230.

Table 1, provided below, illustrates network topology information that may be used to determine signal attenuation characteristics and influence attachment of virtual wireless client devices.

For each virtual client device such as the first CL 230, the table includes virtual wireless access points (e.g., SSIDs) and/or virtual wireless zones e.g., the WAP1 210 and the WAP2 220. The table further includes a client location of the first CL 230 such as x-axis coordinates and y-axis coordinates, an access point location of a respective WAP such as the x-axis coordinates and the y-axis coordinates. The table further includes calculated distance between the first CL 230 and the respective WAP, the frequency band (e.g., freq. in GHz), pathloss measured in dB, transmission power of the respective WAP (in dB) and calculated RSSI. The table 1 is for the first CL 230 at the location A 310, according to an example embodiment.

Table 1 illustrates network topology information and signal attenuation characteristics at the location A 310, according to an example embodiment.

TABLE 1

| CL1 230 | X-axis CL1 | Y-axis CL1 | X-axis WAP | Y-axis WAP | Distance | Freq. | Pathloss (dB) | Tx Power (dB) | RSSI |
|---|---|---|---|---|---|---|---|---|---|
| WAP1 210 | 280 | 640 | 415 | 570 | 152.07 | 2400 | 111.57 | 50 | −61.57 |
| WAP2 220 | 280 | 640 | 650 | 760 | 388.97 | 2400 | 119.73 | 50 | −69.73 |

Based on the table above, the first CL 230 prefers to join the WAP1 210, at the location A 310 because the calculated RSSI at this location for the WAP1 210 is less than for the WAP2 220. As such, the first CL 230 joins or is attached to the WAP1 at the location A 310.

With continued reference to FIGS. 1A-3, FIG. 4 is a view illustrating a user interface screen 400 in which a virtual wireless client device is roaming into a different virtual wireless access point during a network simulation, according to an example embodiment. In the user interface screen 400, the first CL 230 moves from the location C 330 of FIG. 3 to a location D 410. In the location C 330, the first CL 230 is wirelessly attached or connected to the WAP1 210, at 420. In the location D 410, the first CL 230 joins the WAP2 220 instead of the WAP1 210, at 430.

If a virtual wireless client device is moved, the calculations change and may result in the WAP2 220 being preferred over the WAP1 210. If the first CL 230 was already joined to WAP1, at 420, the first CL 230 then roams to the WAP2 220, at 430. Specifically, table 2, provided below, illustrates newly determined signal attenuation characteristics at the location D 410, according to an example embodiment.

Table 2 illustrates network topology information and signal attenuation characteristics at the location D 410, according to an example embodiment.

TABLE 2

| CL1 230 | X-axis CL1 | Y-axis CL1 | X-axis WAP | Y-axis WAP | Distance | Freq. | Pathloss (dB) | Tx Power (dB) | RSSI |
|---|---|---|---|---|---|---|---|---|---|
| WAP1 210 | 610 | 640 | 415 | 570 | 207.18 | 2400 | 114.26 | 50 | −64.26 |
| WAP2 220 | 610 | 640 | 650 | 760 | 126.49 | 2400 | 109.97 | 50 | −59.97 |

Table 2 is just one example of roaming performed by the first CL 230. In one or more example embodiments, other attributes may be adjusted to influence roaming and/or AP joining by virtual wireless client devices in a simulation. For example, in addition to changing the location (moving the virtual wireless client device) or instead of changing the location, the transmitter power levels may be adjusted to influence AP joining and/or roaming.

In one or more example embodiments, generating and/or configuring a virtual wireless network may be performed via the simulation workspace UI 152 of FIG. 2. Instead of using a "boots on the ground" approach, a user such as the user 194, may obtain a heatmap of a physical space, and manipulate the run simulation button 154, the stop simulation button 156, and/or the UI tools 158 to generate a virtual wireless network based on network topology information of a wireless network in the physical space. The user may run one or more simulations to determine signal attenuation characteristics of the virtual wireless devices i.e., the virtual wireless network, to adjust roaming and joining of a virtual wireless access point, generate virtual wireless network zones, etc. The user may move or roam virtual client devices in the generated virtual wireless network and/or add one or more interference factors to evaluate operations of the virtual wireless network in the network simulation.

In one or more example embodiments, the simulation logic 122 with the wireless network management logic 132 may run one or more network simulations and determine optimal attributes for the virtual wireless network e.g., to minimize signal attenuation, avoid jitter, interference, etc. In one or more example embodiments, the simulation logic 122 with the wireless network management logic 132 generate a virtual wireless network in which virtual zones are generated to reduce signal attenuation characteristics and in which virtual wireless access points are configured to avoid dead zones, etc. Based on these network simulations, operation and performance of a wireless network is evaluated including validating, testing, and troubleshooting. Based on these network simulations, the wireless network is emulated for complex scenarios without needing physical presence in the physical space and/or actual physical devices (access point, client device, etc.)

The techniques presented herein generate a virtual wireless network configured to transmit virtual 802.11 frames based on provided physical characteristics of a physical space e.g., as defined in a heatmap.

Figure 5:
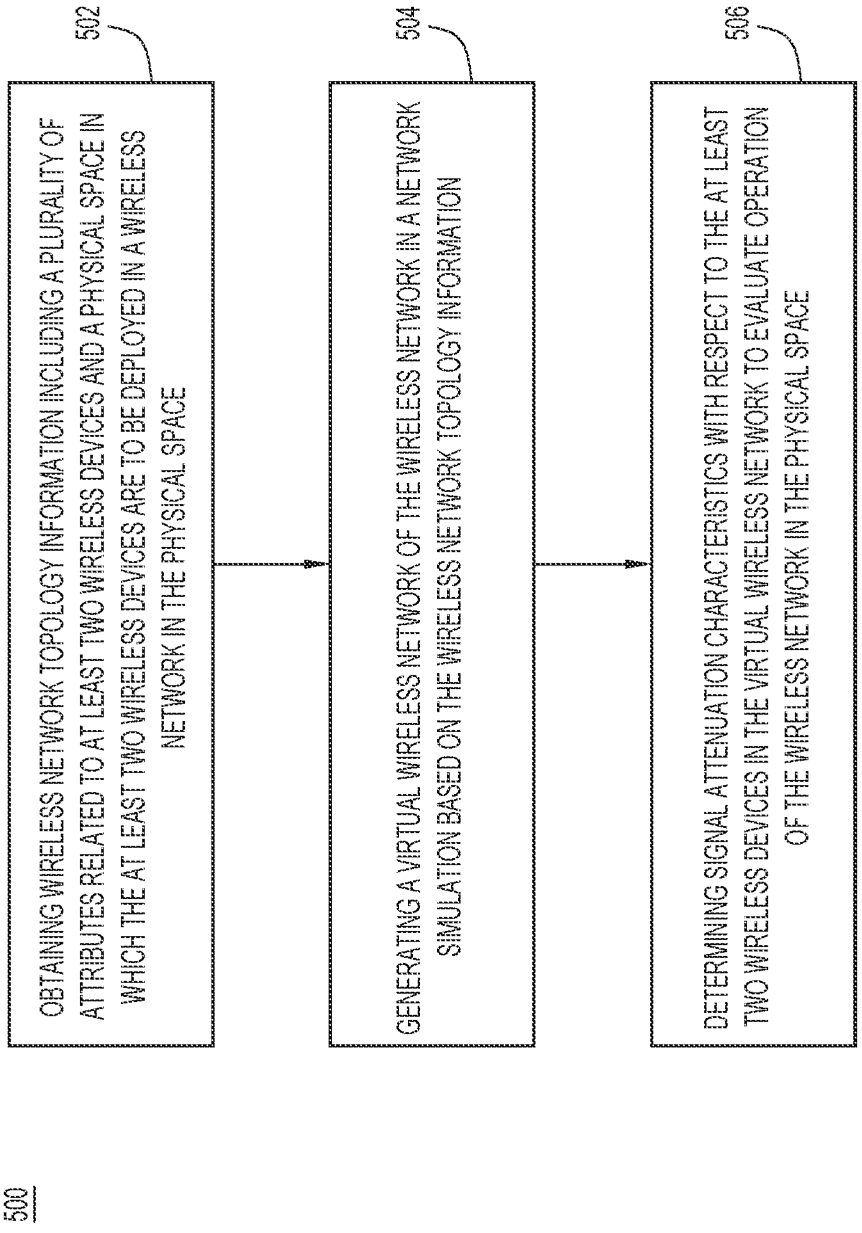
FIG. 5 is a flowchart illustrating a method of determining signal attenuation characteristics with respect to wireless devices in a virtual wireless network, according to an example embodiment.

FIG. 5 is a flowchart illustrating a method 500 of determining signal attenuation characteristics with respect to wireless devices in a virtual wireless network, according to an example embodiment. The method 500 may be performed by a computing device such as a server or a group of servers or by a simulation controller, such as controller 120 of network simulation system 110, as shown in FIG. 1A.

The method 500 involves, at 502, obtaining wireless network topology information including a plurality of attributes related to at least two wireless devices and a physical space in which the at least two wireless devices are to be deployed in a wireless network in the physical space.

The method 500 further involves at 504, generating a virtual wireless network of the wireless network in a network simulation based on the wireless network topology information.

The method 500 further involves at 506, determining signal attenuation characteristics with respect to the at least two wireless devices in the virtual wireless network to evaluate operation of the wireless network in the physical space.

According to one or more example embodiments, the method 500 may further involve configuring a wireless device in the wireless network based on determining the signal attenuation characteristics in the network simulation.

In one form, the operation 504 of generating the virtual wireless network may include emulating a wireless access point and a wireless client device to provide a virtual wireless access point and a virtual wireless client device in the virtual wireless network. The operation 504 of generating the virtual wireless network may further include establishing a virtual wireless connection between the virtual wireless access point and the virtual wireless client device in the network simulation.

In another form, the operation 506 of determining the signal attenuation characteristics may include adding, via a user interface, one or more interference factors in the network simulation and measuring the signal attenuation characteristics associated with movement of the virtual wireless client device in the virtual wireless network. The operation 506 of determining the signal attenuation characteristics may further include determining performance of the virtual wireless network based on the signal attenuation characteristics.

In one instance, the one or more interference factors may involve a plurality of virtual objects being added to the network simulation and representing physical objects or structures in the physical space.

In another instance, the operation 506 of determining the signal attenuation characteristics may involve obtaining, via a user interface, input data related to a roaming of the wireless client device between virtual wireless access points in the network simulation. The operation 506 of determining the signal attenuation characteristics may further involve moving the virtual wireless client device to one or more locations in the network simulation based on the input data and measuring the signal attenuation characteristics of the virtual wireless client device at each of the one or more locations in the network simulation.

According to one or more example embodiments, the method 500 may further involve obtaining, via the user interface, one or more reconfiguration instructions based on measuring of the signal attenuation characteristics at the one or more locations. The one or more reconfiguration instructions may involve adding an additional wireless access point or changing one or more of wireless network transmission parameters including a signal strength or a range of a respective virtual wireless access point in the virtual wireless network of the network simulation.

In one form, the method 500 may further involve generating at least two virtual wireless zones in the network simulation. Each of the at least two virtual wireless zones may include an associated virtual wireless access point and metadata defining relative dimensions and other attributes of a respective zone of the at least two virtual wireless zones.

In one instance, the method 500 may further involve establishing a virtual wired connection between the at least two virtual wireless zones in the network simulation and determining a connectivity profile of a virtual wireless client device in the network simulation by roaming the virtual wireless client device to a plurality of locations within the at least two virtual wireless zones.

In another form, the method 500 may further involve obtaining a heatmap of the physical space. The at least two virtual wireless zones may be generated based on the heatmap.

According to one or more example embodiments, the operation of generating the at least two virtual wireless zones in the network simulation may involve determining one or more attributes of a respective virtual wireless zone based on characteristics of the physical space defined in the heatmap. The one or more attributes may involve orientation, size, or shape of the respective virtual wireless zone.

In one instance, the operation 506 of determining the signal attenuation characteristics of the at least two wireless devices may involve generating a signal attenuation model based on measuring latency of one or more virtual traffic data frames propagating between the at least two wireless devices in the network simulation.

Figure 6:
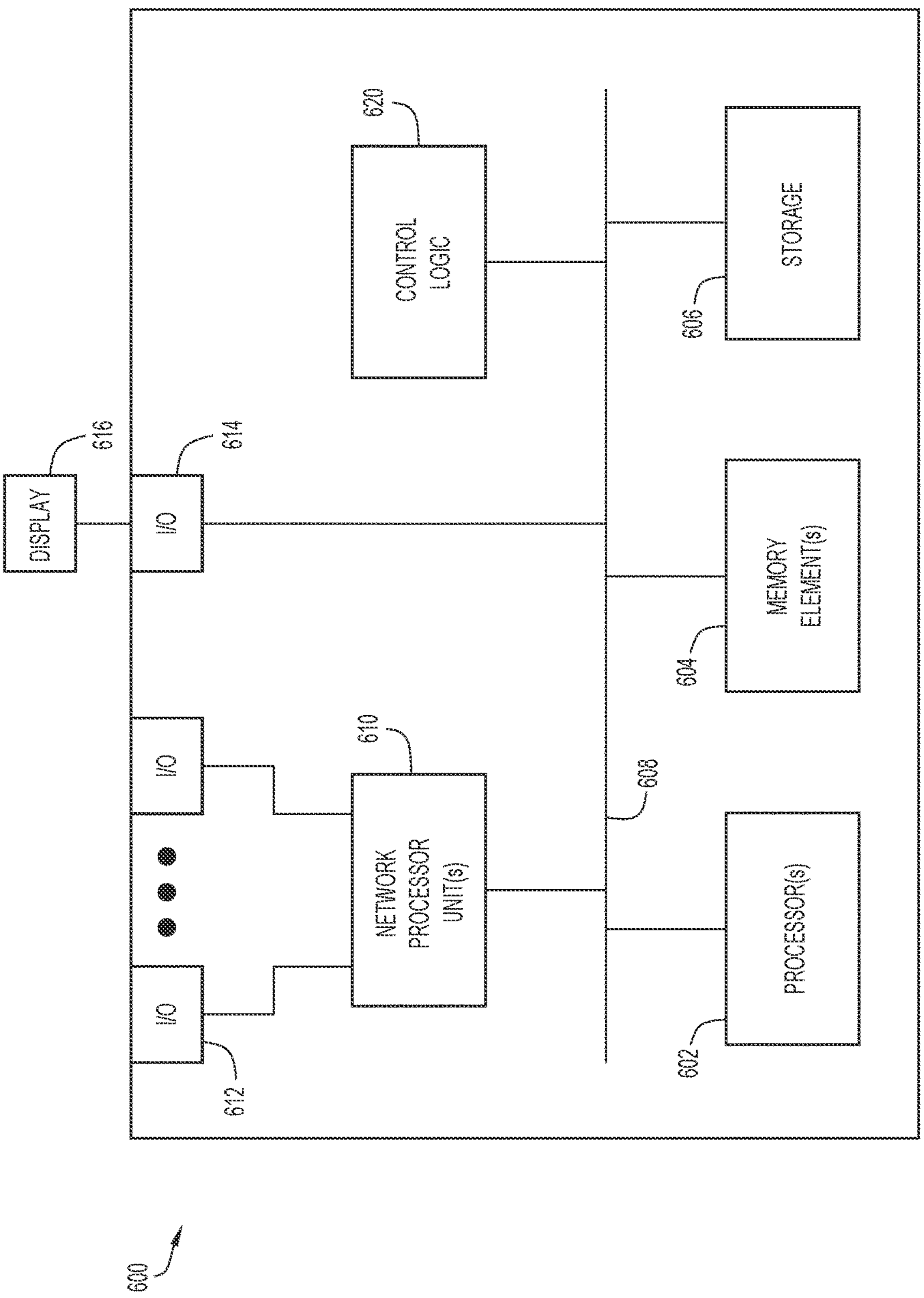
FIG. 6 is a hardware block diagram of a computing device that may perform functions associated with any combination of operations in connection with the techniques depicted and described in FIGS. 1-5, according to various example embodiments.

FIG. 6 is a hardware block diagram of a computing device 600 that may perform functions associated with any combination of operations in connection with the techniques depicted in FIGS. 1-5, according to various example embodiments, including, but not limited to, operations of the computing device or one or more servers that execute the network simulation and/or the apparatus. Further, the computing device 600 may be representative of one of the network devices, network/computing equipment, or hardware asset of an enterprise such as a wireless access point, a client device or an apparatus. It should be appreciated that FIG. 6 provides only an illustration of one example embodiment and does not imply any limitations with respect to the environments in which different example embodiments may be implemented. Many modifications to the depicted environment may be made.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element (s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with one or more memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 616 such as a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform a method including obtaining wireless network topology information including a plurality of attributes related to at least two wireless devices and a physical space in which the at least two wireless devices are to be deployed in a wireless network in the physical space. The method further includes generating a virtual wireless network of the wireless network in a network simulation based on the wireless network topology information and determining signal attenuation characteristics with respect to the at least two wireless devices in the virtual wireless network to evaluate operation of the wireless network in the physical space.

In yet another example embodiment, one or more non-transitory computer readable storage media encoded with instructions are provided. When the media is executed by a processor, the instructions cause the processor to execute a method that includes obtaining wireless network topology information including a plurality of attributes related to at least two wireless devices and a physical space in which the at least two wireless devices are to be deployed in a wireless network in the physical space. The method further includes generating a virtual wireless network of the wireless network in a network simulation based on the wireless network topology information and determining signal attenuation characteristics with respect to the at least two wireless devices in the virtual wireless network to evaluate operation of the wireless network in the physical space.

In yet another example embodiment, a system is provided that includes the devices and operations explained above with reference to FIGS. 1-6.

The programs described herein (e.g., control logic 620) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 606 and/or memory elements(s) 604 can store data, software, code, instructions (e.g., processor instructions), logic, parameters, combinations thereof, and/or the like used for operations described herein. This includes the storage 606 and/or memory elements(s) 604 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of and' one or more of can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method comprising:

obtaining wireless network topology information including a plurality of attributes related to at least two wireless devices and a physical space in which the at least two wireless devices are to be deployed in a wireless network in the physical space;

generating a virtual wireless network of the wireless network in a network simulation based on the wireless network topology information;

determining signal attenuation characteristics with respect to the at least two wireless devices in the virtual wireless network to evaluate operation of the wireless network in the physical space; and generating at least two virtual wireless zones in the network simulation, wherein each of the at least two virtual wireless zones includes an associated virtual wireless access point and metadata defining relative dimensions and other attributes of a respective zone of the at least two virtual wireless zones.

2. The method of claim 1, further comprising:

configuring a wireless device in the wireless network based on determining the signal attenuation characteristics in the network simulation.

3. The method of claim 1, wherein generating the virtual wireless network includes:

emulating a wireless access point and a wireless client device to provide a virtual wireless access point and a virtual wireless client device in the virtual wireless network; and establishing a virtual wireless connection between the virtual wireless access point and the virtual wireless client device in the network simulation.

4. The method of claim 3, wherein determining the signal attenuation characteristics includes:

adding, via a user interface, one or more interference factors in the network simulation;

measuring the signal attenuation characteristics associated with movement of the virtual wireless client device in the virtual wireless network; and determining performance of the virtual wireless network based on the signal attenuation characteristics.

5. The method of claim 4, wherein the one or more interference factors involve a plurality of virtual objects being added to the network simulation and representing physical objects or structures in the physical space.

6. The method of claim 3, wherein determining the signal attenuation characteristics includes:

obtaining, via a user interface, input data related to a roaming of the wireless client device between virtual wireless access points in the network simulation;

moving the virtual wireless client device to one or more locations in the network simulation based on the input data; and measuring the signal attenuation characteristics of the virtual wireless client device at each of the one or more locations in the network simulation.

7. The method of claim 6, further comprising:

obtaining, via the user interface, one or more reconfiguration instructions based on measuring of the signal attenuation characteristics at the one or more locations, wherein the one or more reconfiguration instructions involve adding an additional wireless access point or changing one or more of wireless network transmission parameters including a signal strength or a range of a respective virtual wireless access point in the virtual wireless network of the network simulation.

8. The method of claim 1, wherein the signal attenuation characteristics include measures for pathloss.

9. The method of claim 1, further comprising:

establishing a virtual wired connection between the at least two virtual wireless zones in the network simulation; and determining a connectivity profile of a virtual wireless client device in the network simulation by roaming the virtual wireless client device to a plurality of locations within the at least two virtual wireless zones.

10. The method of claim 1, further comprising:

obtaining a heatmap of the physical space, wherein the at least two virtual wireless zones are generated based on the heatmap.

11. The method of claim 10, wherein generating the at least two virtual wireless zones in the network simulation includes:

determining one or more attributes of a respective virtual wireless zone based on characteristics of the physical space defined in the heatmap, wherein the one or more attributes include orientation, size, or shape of the respective virtual wireless zone.

12. The method of claim 1, wherein determining the signal attenuation characteristics of the at least two wireless devices includes:

generating a signal attenuation model based on measuring latency of one or more virtual traffic data frames propagating between the at least two wireless devices in the network simulation.

13. An apparatus comprising:

a memory;

a network interface configured to enable network communications; and a processor, wherein the processor is configured to perform a method comprising:

obtaining wireless network topology information including a plurality of attributes related to at least two wireless devices and a physical space in which the at least two wireless devices are to be deployed in a wireless network in the physical space;

generating a virtual wireless network of the wireless network in a network simulation based on the wireless network topology information;

determining signal attenuation characteristics with respect to the at least two wireless devices in the virtual wireless network to evaluate operation of the wireless network in the physical space; and generating at least two virtual wireless zones in the network simulation, wherein each of the at least two virtual wireless zones includes an associated virtual wireless access point and metadata defining relative dimensions and other attributes of a respective zone of the at least two virtual wireless zones.

14. The apparatus of claim 13, wherein the processor is further configured to perform:

configuring a wireless device in the wireless network based on determining the signal attenuation characteristics in the network simulation.

15. The apparatus of claim 13, wherein the processor is configured to generate the virtual wireless network by:

emulating a wireless access point and a wireless client device to provide a virtual wireless access point and a virtual wireless client device in the virtual wireless network; and establishing a virtual wireless connection between the virtual wireless access point and the virtual wireless client device in the network simulation.

16. The apparatus of claim 15, wherein the processor is configured to determine the signal attenuation characteristics by:

adding, via a user interface, one or more interference factors in the network simulation;

measuring the signal attenuation characteristics associated with movement of the virtual wireless client device in the virtual wireless network; and determining performance of the virtual wireless network based on the signal attenuation characteristics.

17. One or more non-transitory computer readable storage media encoded with software comprising computer executable instructions that, when executed by a processor, cause the processor to perform a method including:

obtaining wireless network topology information including a plurality of attributes related to at least two wireless devices and a physical space in which the at least two wireless devices are to be deployed in a wireless network in the physical space;

generating a virtual wireless network of the wireless network in a network simulation based on the wireless network topology information;

determining signal attenuation characteristics with respect to the at least two wireless devices in the virtual wireless network to evaluate operation of the wireless network in the physical space; and generating at least two virtual wireless zones in the network simulation, wherein each of the at least two virtual wireless zones includes an associated virtual wireless access point and metadata defining relative dimensions and other attributes of a respective zone of the at least two virtual wireless zones.

18. The one or more non-transitory computer readable storage media according to claim 17, wherein the computer executable instructions cause the processor to further perform:

configuring a wireless device in the wireless network based on determining the signal attenuation characteristics in the network simulation.

19. The one or more non-transitory computer readable storage media according to claim 17, wherein the computer executable instructions cause the processor to generate the virtual wireless network by:

emulating a wireless access point and a wireless client device to provide a virtual wireless access point and a virtual wireless client device in the virtual wireless network; and establishing a virtual wireless connection between the virtual wireless access point and the virtual wireless client device in the network simulation.

20. The one or more non-transitory computer readable storage media according to claim 19, wherein the computer executable instructions cause the processor to determine the signal attenuation characteristics by:

adding, via a user interface, one or more interference factors in the network simulation;

measuring the signal attenuation characteristics associated with movement of the virtual wireless client device in the virtual wireless network; and determining performance of the virtual wireless network based on the signal attenuation characteristics.

* * * * *